US008286113B1

(12) United States Patent
Bridgford et al.

(10) Patent No.: US 8,286,113 B1
(45) Date of Patent: Oct. 9, 2012

(54) VERIFICATION OF LOGIC CORE IMPLEMENTATION

(75) Inventors: Brendan K. Bridgford, Vienna, VA (US); Jason J. Moore, Albuquerque, NM (US); W. Story Leavesley, III, Longmont, CO (US); Derrick S. Woods, Loveland, CO (US)

(73) Assignee: Xilinx, Inc., San Jose, CA (US)

( * ) Notice: Subject to any disclaimer, the term of this patent is extended or adjusted under 35 U.S.C. 154(b) by 128 days.

(21) Appl. No.: 13/004,183

(22) Filed: Jan. 11, 2011

(51) Int. Cl.
*G06F 17/50* (2006.01)
*G06F 15/177* (2006.01)
*G06F 9/00* (2006.01)

(52) U.S. Cl. ........ 716/117; 716/121; 716/128; 716/107; 716/136; 713/2; 713/100

(58) Field of Classification Search .................. 716/117, 716/121, 128, 107, 111, 136; 713/2, 100
See application file for complete search history.

(56) References Cited

U.S. PATENT DOCUMENTS

| | | | | |
|---|---|---|---|---|
| 6,086,631 A * | 7/2000 | Chaudhary et al. | ........... | 716/116 |
| 6,099,583 A * | 8/2000 | Nag | .............. | 716/117 |
| 6,904,527 B1 * | 6/2005 | Parlour et al. | ................. | 713/189 |
| 6,981,153 B1 * | 12/2005 | Pang et al. | ..................... | 713/194 |
| 7,519,823 B1 * | 4/2009 | Schumacher et al. | ........ | 713/176 |
| 7,546,394 B1 * | 6/2009 | Jacobson et al. | ................ | 710/23 |
| 7,657,853 B2 * | 2/2010 | Sato et al. | ..................... | 716/106 |
| 7,673,273 B2 * | 3/2010 | Madurawe et al. | ........... | 716/138 |
| 7,685,327 B1 * | 3/2010 | Jacobson et al. | ................ | 710/10 |
| 7,710,147 B1 * | 5/2010 | White et al. | .................... | 326/38 |
| 7,721,284 B2 * | 5/2010 | Bykov et al. | ................... | 717/178 |
| 7,878,902 B2 * | 2/2011 | Mattice et al. | .................. | 463/29 |
| 7,890,916 B1 * | 2/2011 | Donlin et al. | ................. | 716/116 |
| 7,984,292 B1 * | 7/2011 | Streicher et al. | ............. | 713/160 |
| 8,103,992 B1 * | 1/2012 | Chan et al. | .................... | 716/100 |
| 8,117,580 B1 * | 2/2012 | Trimberger | .................... | 716/116 |
| 2006/0282657 A1 * | 12/2006 | Schofl et al. | ...................... | 713/1 |
| 2007/0283311 A1 * | 12/2007 | Karoubalis et al. | ............ | 716/16 |
| 2010/0283505 A1 * | 11/2010 | Koch et al. | ...................... | 326/41 |
| 2011/0126164 A1 * | 5/2011 | Marui | ........................... | 716/117 |

\* cited by examiner

*Primary Examiner* — Phallaka Kik
(74) *Attorney, Agent, or Firm* — LeRoy D. Maunu; Lois D. Cartier

(57) ABSTRACT

A system and method are provided for verifying implementation of a logic core in a complete bitstream. A logic core bitstream is extracted from the complete bitstream. The logic core bitstream is compared to a reference bitstream of the logic core for a target device. In response to no discrepancy in the comparison of the logic core bitstream and the reference bitstream, a data value is stored indicating that the logic core implementation contained in the complete bitstream is verified.

20 Claims, 6 Drawing Sheets

VERIFICATION OF LOGIC CORE IMPLEMENTATION

GOVERNMENT LICENSE RIGHTS

The U.S. government may have certain rights to this invention as provided for by the terms of Contract #H98230-06-C-1328 awarded by the Maryland Procurement Office.

FIELD OF THE INVENTION

One or more embodiments generally relate to integrated circuit design, and more particularly to the verification of design information after implementation.

BACKGROUND

Due to advancements in information processing technology, complex integrated circuits (ICs) can be designed using various levels of abstraction. Using a hardware description language (HDL), circuits can be designed at the gate level, the register transfer level (RTL), and higher logical levels. When designing using an HDL, the designer describes the behavior of a system in terms of signals that are generated and propagated from one set of registers to another set of registers through combinatorial logic modules. HDLs provide a rich set of constructs to describe the functionality of each module. Modules may be combined and augmented to form even higher-level modules.

System-level integration relies on reuse of previously created designs that have been provided either from within an enterprise or from a commercial provider. Libraries of pre-developed blocks of logic have been developed that can be selected and included in a circuit design. Such library modules include, for example, adders, multipliers, filters, and other arithmetic and digital signal processing (DSP) functions from which system designs can be readily constructed. The library modules may further include memories and storage elements. The engineering community sometimes refers to these previously created designs as "design modules," "cores," "IP cores" (intellectual property cores), or "logic cores," and such terms may be used interchangeably herein. The use of pre-developed logic cores permits faster design cycles by eliminating the redesign of circuits. Thus, using cores from a library may reduce design costs. Such logic cores may often be available for purchase by third parties who desire the functionality provided by the core, but do not have the time and/or resources necessary to design them.

Logic cores include a circuit design in the form of source code or a netlist that may be used in implementing the design in a programmable IC, such as a field programmable gate array (FPGA). Logic cores may be parameterizable. That is, the designer may specify values of parameters to tailor certain core functionality according to the designer's needs. The core may be integrated into a design by instantiating the code or netlist. The logic core is then placed and routed along with the rest of the design to provide the desired functionality.

Incorporation of a logic core into a larger design, however, may not be a simple task. For example, different logic cores included in a design may be configured to communicate using different bus protocols. In order to integrate a core, a designer often must create interface logic, sometimes referred to as "glue logic," to connect the logic core to a standard bus used in the design. Integration can be a time consuming process. To ease the integration process, integrated software environments (ISEs) automate much of the integration process. These ISEs automatically generate wrapper code containing the required interconnect logic and allow the designer to configure some parameters of the core. This may be referred to as a core generation. High level modeling and design implementation tools, such as the System Generator for Digital Signal Processing (DSP) (SysGen), may be used to generate each core. SysGen, for example, provides a block diagram-based user interface for designing and debugging complex systems such as those involving highly parameterizable and reusable cores. The generated core is then placed and routed along with the rest of the design.

Both manual and automated integration methods result in an implementation unique to the selected parameters and generated interface. Although correct operation of a logic core may have been verified by the logic core provider, parameterization and interconnect logic generated by the designer or automated tool may change operation of the core. Thus, the function provided by the core must be verified after integration is completed. For this reason, a number of application areas, such as avionics, defense, etc., often require verification of the correct operation of the logic core as implemented in the circuit.

One verification method pre-verifies the processes implemented by automated integration tools. For example, an ISE can be tested to ensure that the integration process produces the same implementation for every instance of an imported logic core. The resulting implementation of the logic core can then be analyzed to pre-verify integration of a specific logic core using the automated tool. Once an integration process is verified for a logic core, correct integration of the core can be ensured. However, whenever the software tool is updated, verification of the software must be repeated for each core. This update process is complex and time consuming.

One or more embodiments of the present invention may address one or more of the above issues.

SUMMARY

In one embodiment, a method is provided for verifying implementation of a logic core in a complete bitstream. Using one or more processors, a logic core bitstream is extracted from the complete bitstream. The logic core bitstream is compared to a reference bitstream of the logic core for a target device. In response to no discrepancy in the comparison of the logic core bitstream and the reference bitstream, a data value is stored indicating that the logic core implementation contained in the complete bitstream is verified. In response to a discrepancy in the comparison of the logic core bitstream and the reference bitstream, a data value is stored indicating that the logic core implementation contained in the complete bitstream is not verified.

In another embodiment, a system is provided for verifying implementation of a logic core in a complete bitstream. The system includes one or more processors and a memory arrangement coupled to the one or more processors. The memory arrangement is configured with instructions that when executed by the one or more processors cause the one or more processors to extract a logic core bitstream of the logic core from the complete bitstream and compare the logic core bitstream to a reference bitstream of a verified logic core implementation for a target device. In response to no discrepancy in the comparison of the logic core bitstream and the reference bitstream, the one or more processors are configured to store a data value indicating that the logic core implementation extracted from the complete bitstream is verified. In response to a discrepancy in the comparison of the logic core bitstream and the reference bitstream, the one or more processors are configured to store a data value indicating that the logic core implementation extracted from the complete bitstream could not be verified.

In yet another embodiment, a method is provided for verifying implementation of a logic core after placement and routing. Using one or more processors, a circuit design is placed and routed. The placement and routing avoids routing and logic resources utilized by a pre-implemented version of the logic core for a target programmable IC. The placed and routed circuit design is merged with the pre-implemented version of the logic core to produce a complete design. The complete design is converted into a bitstream format to produce a complete bitstream. The logic core bitstream is extracted from the complete bitstream. The logic core bitstream is compared to a reference bitstream of the logic core to verify there is no discrepancy between the logic core bitstream and the reference bitstream.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Logic cores are typically provided in a source code or netlist format to allow for broad parameterization and compatible implementation on a wide variety of programmable ICs. Critical applications often require correct operation of circuitry to be verified. Although correct operation of a logic core may have been verified as implemented by the logic core provider, the interconnect logic and parameterization used to integrate the logic core into a specific application or device may affect operation of the core. In other cases, development software may inadvertently modify the core and result in a change in the functionality of the core. Accordingly, additional time and expense are often required to verify correct operation of the logic core following implementation.

One or more embodiments provide a method for logic core implementation and verification. A logic core may be implemented, placed, routed, and verified by the logic core provider for a target programmable IC. The placed and routed logic core can then be provided to a designer for incorporation into a circuit design for the target programmable IC. Because the logic core is already placed and routed, the placement and routing of the logic core and associated configuration bits for the target programmable IC should not change unless the implementation has been modified. After integration of the logic core into a design and implementation of the design into a configuration bitstream, the portion of the configuration bitstream corresponding to the logic core may be isolated and compared to a reference bitstream portion to determine whether the implementation of the logic core has been changed. If the bitstreams match, the designer may have confidence that operation of the integrated logic core is consistent with operation of the logic core as previously verified by the logic core provider. The verification processes described herein allow one to verify that a core has been implemented in a design exactly as intended by the logic core provider. This is extremely valuable for markets that require approval by a certifying body.

The verification process also reduces the maintenance required for an IP core developer. Previously, for each new version of development software, a logic core would require placement, routing, and verification to be repeated. Because each logic core is pre-placed and routed for a target programmable IC, the logic core does not need to be updated and verified for new versions of development software. For each target device, the core can be certified once and then subsequent implementations can be certified by analyzing the configuration bitstream instead of re-running lengthy tests.

Figure 1:
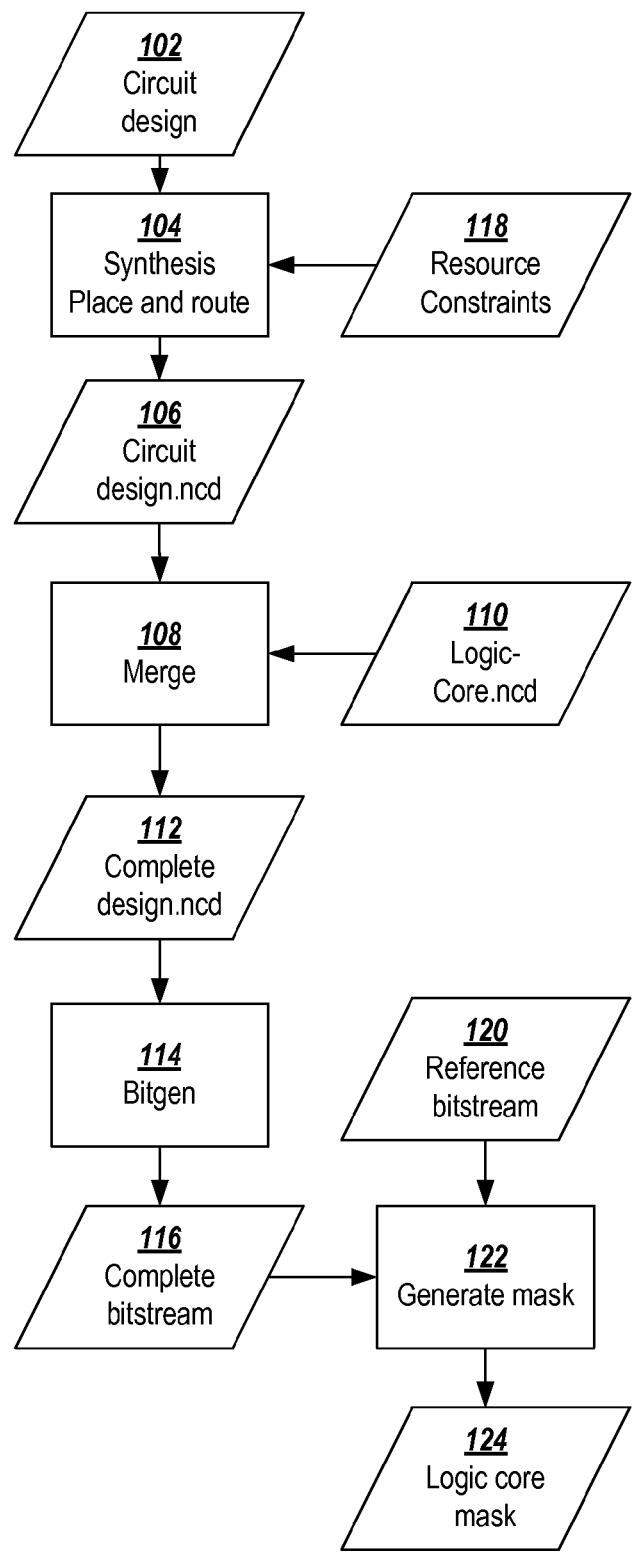
FIG. 1 shows a flowchart of an example process for integrating a logic core into a circuit design.

FIG. 1 shows a flowchart of an example process for integrating a pre-verified logic core into a circuit design. In this example, the logic core 110 is provided and merged with a circuit design in a placed and routed native circuit description (NCD) format. The NCD format may be particular to a specific target programmable IC and particular to the maker of that programmable IC. The designer's circuit design 102 is synthesized, placed, and routed at process block 104 to produce a placed and routed circuit design 106. In placing and routing the circuit design 102, a resource constraints file 118 is used to reserve processing/logic and routing resources of the target device needed to implement the logic core 110. The resource constraints file 118 may be distributed by the logic core provider along with the logic core 110, or may be generated from the logic core 110 by the designer.

The circuit design 102 and logic core 110 in NCD format are merged at process block 108 to produce a complete circuit design 112 in NCD format. One skilled in the art will recognize that place-and-route block 104 may alternatively be implemented to import logic core 110 directly and route circuit design 102 in a manner that preserves the existing placement and routing of the logic core 110. In such an implementation, place-and-route block 104 outputs the complete design 112, eliminating the need for a separate merge process block 108. For example, the processing of block 108 (merge) may be performed prior to the processing of block 104 (implementation). The IP implementation may be merged before the customer design implementation to prevent possible resource conflicts, and to provide more optimal implementation of the customer design. One skilled in the art will recognize that the merge processing may be performed before or after customer implementation. To support merging after customer implementation (as shown in FIGS. 1 and 2) resource constraints (118) are provided to avoid conflicts between the logic core and the circuit design over logic and routing resources.

The complete circuit design 112 is converted into a bitstream format 116 at process block 114. In the bitstream format 116, the complete circuit design 112 is represented in a sequence of bits that may be used to directly configure the target programmable logic IC to implement the complete circuit design. In this example, a logic core mask 124 is generated at process block 122 to assist in later extraction of the logic core from the bitstream 116 for verification. The logic core mask may be generated by comparing a reference bitstream 120 of the logic core 110 with the complete bitstream 116 to determine bits corresponding to the logic core 110. The reference bitstream 120 may be distributed by the logic core provider along with the logic core 110 or may be generated from the logic core 110 by the designer.

In this example, logic core 110, resource constraints file 118, and reference bitstream 120 of the logic core are provided by the logic core provider. One skilled in the art will recognize that resource constraints file 118 and reference bitstream 120 could alternatively be generated by the designer from the logic core 110. Similarly, the logic core mask 124 could alternatively be provided by the logic core provider along with the reference bitstream 120, resource constraints 118, and/or logic core 110.

Figure 2:
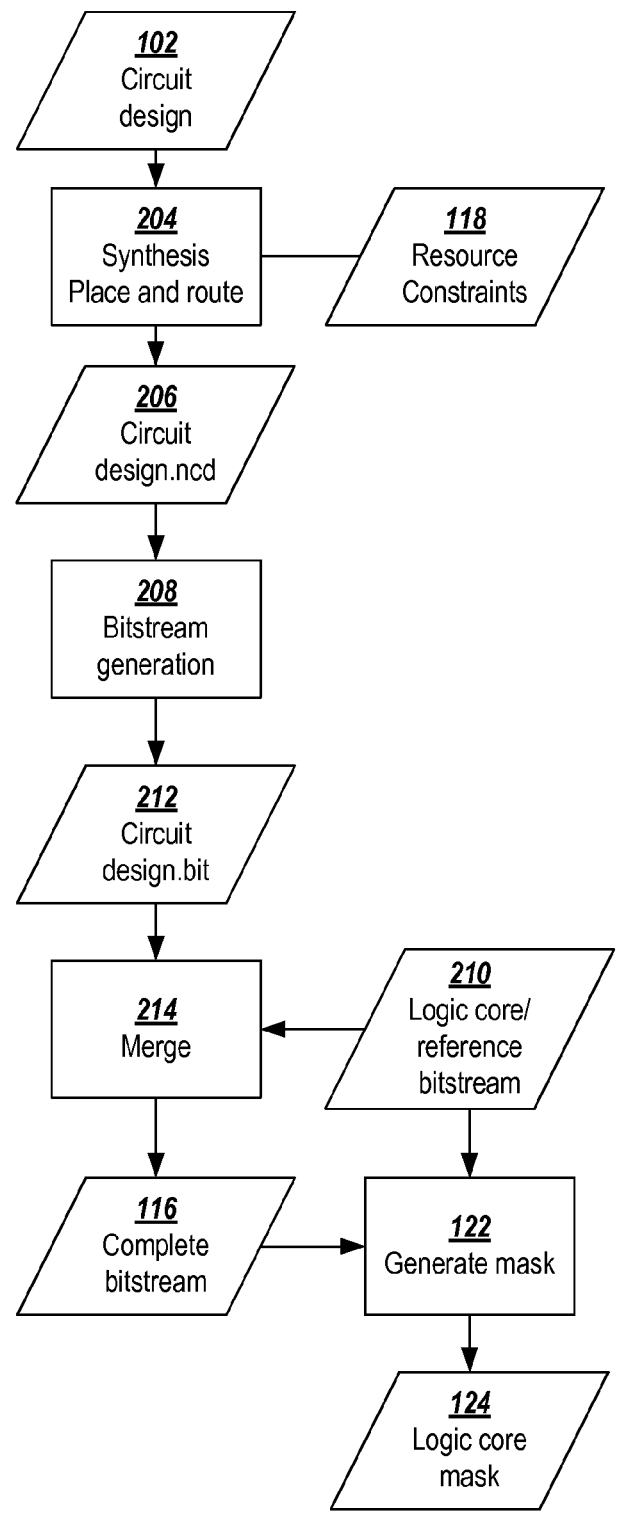
FIG. 2 shows a flowchart of another example process for integrating a logic core into a circuit design.

FIG. 2 shows a flowchart of an example process for integrating a pre-verified logic core into a circuit design. In this example, the logic core 110 shown in FIG. 1 is provided and merged with circuit design 102 in a bitstream format 210. The circuit design 102 is synthesized, placed, and routed at process block 204 to produce a placed-and-routed circuit design 206. As described in relation to FIG. 1, resource constraints 118 are used to reserve processing/logic and routing resources of the target device needed to implement the logic core during placement and routing. The placed-and-routed circuit design 206 is converted to a bitstream format 212 at process block 208. The circuit design bitstream 212 and logic core bitstream 210 are merged at process block 214 to produce the complete bitstream 116.

In this example, the logic core 218 is provided in a bitstream format. In another implementation, the logic core may optionally be provided in the placed-and-routed NCD format 110, shown in FIG. 1, and converted into the bitstream format 210 by a user process. As described in relation to FIG. 1, the logic core mask 124 is generated at process block 122 to assist in later extraction of the logic core from the complete bitstream 116 for verification.

Figure 3:
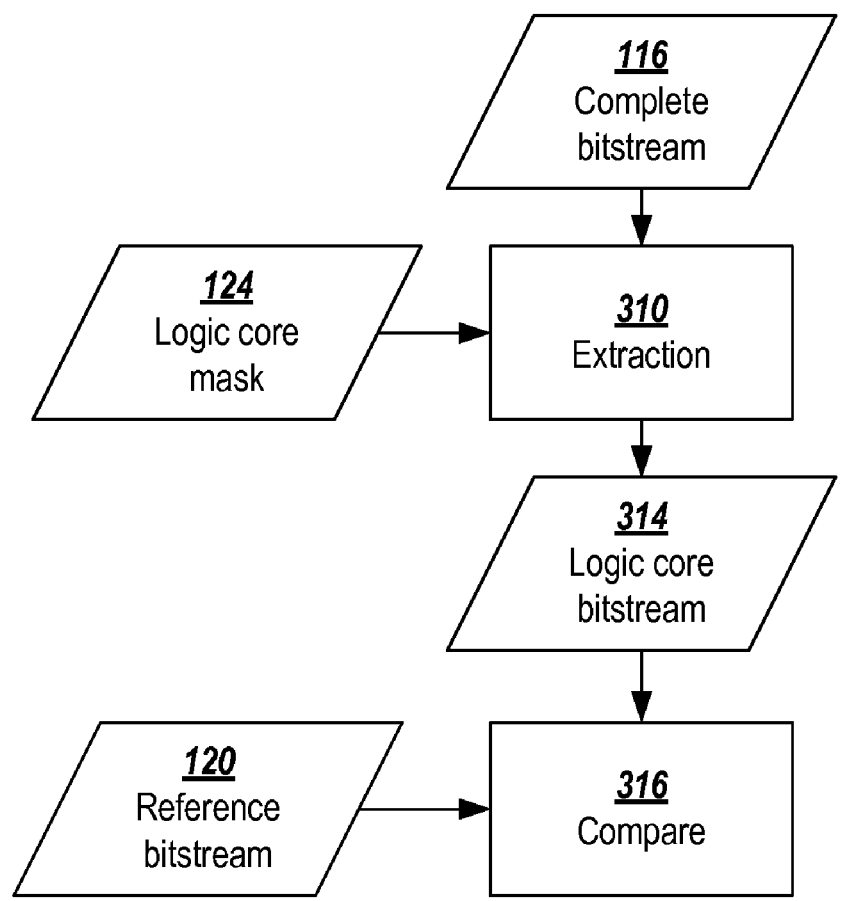
FIG. 3 shows a flowchart of an example process for post-implementation verification of a logic core.

FIG. 3 shows a flowchart of an example process for post-implementation verification of a logic core. After a pre-verified logic core has been integrated into a circuit design and the complete circuit design has been implemented as a bitstream, the process of FIG. 3 may be used to verify that the logic core as implemented in the complete bitstream is consistent with the pre-verified logic core implementation. Process block 310 extracts the logic core bitstream 314, which is to be verified from the complete bitstream 116. In this example implementation, the extraction process is performed using the logic core mask 124 (generated in FIGS. 1 and 2). The logic core mask 124 is configured to mask all bits of the complete bitstream 116 except those utilized by the pre-verified logic core as set forth in reference bitstream (FIG. 1, 120). Once extracted, the logic core bitstream 314 is compared to the reference bitstream 120 to verify that the logic core included in the complete bitstream 116 matches the pre-verified version of the logic core as set forth by the reference bitstream 120. In one or more embodiments, a designer may perform parameterization of an implemented logic core by including initialization data in the bitstream for initialization of portions of BRAM memory of the target device. This initialization data is segmented from the logic and routing configuration of the device, and can therefore be modified in pre-determined ways that do not require re-verification. "Therefore, BRAM initialization data bits included in the complete bitstream need not be extracted along with the logic core bitstream 314 for verification. However, in some implementations, the BRAM initialization data may also be extracted to assist in debugging efforts or to validate parameter settings.

In some implementations, the complete bitstream 116 generated in FIG. 1 or 2 may be encrypted in an additional cryptographic process (not shown) for the purposes of secure configuration of the target device. In these implementations, the encrypted bitstream may need to be decrypted as part of the verification process shown in FIG. 3. For example, if the reference bitstream 318 is in a plaintext format, the encrypted bitstreams must be decrypted with a corresponding cryptographic key (not shown) to reproduce the complete bitstream 116. The logic core may then be extracted and verified as described above.

In some design flows, the logic core provider may find it desirable to deliver the logic core in an encrypted format. For example, the logic core may be distributed by means of an intellectual property (IP) rights management system to further protect sensitive information contained in the logic core. In one example implementation, the logic core/reference bitstream may be encrypted with a cryptographic key unknown to the designer. A software tool on the user's system may be configured to securely retrieve a cryptographic key, for example, via a key exchange mechanism. The software tool may then securely decrypt the logic core/reference bitstream and perform merge and/or comparison operations without disclosing the plaintext logic core to the designer.

In another implementation, the reference bitstream may be encrypted with the cryptographic key of a target device, (i.e., the same cryptographic key used to encrypt the complete bitstream 116). In this situation, the logic core bitstream 314 may be extracted from the complete bitstream 116 in encrypted form. The encrypted logic core bitstream 314 may be directly compared to the encrypted reference bitstream to verify the logic core implementation. One skilled in the art will recognize that the above examples are provided for illustrative purposes and the embodiments may be used with a number of other encryption and IP management systems as well.

Figure 4:
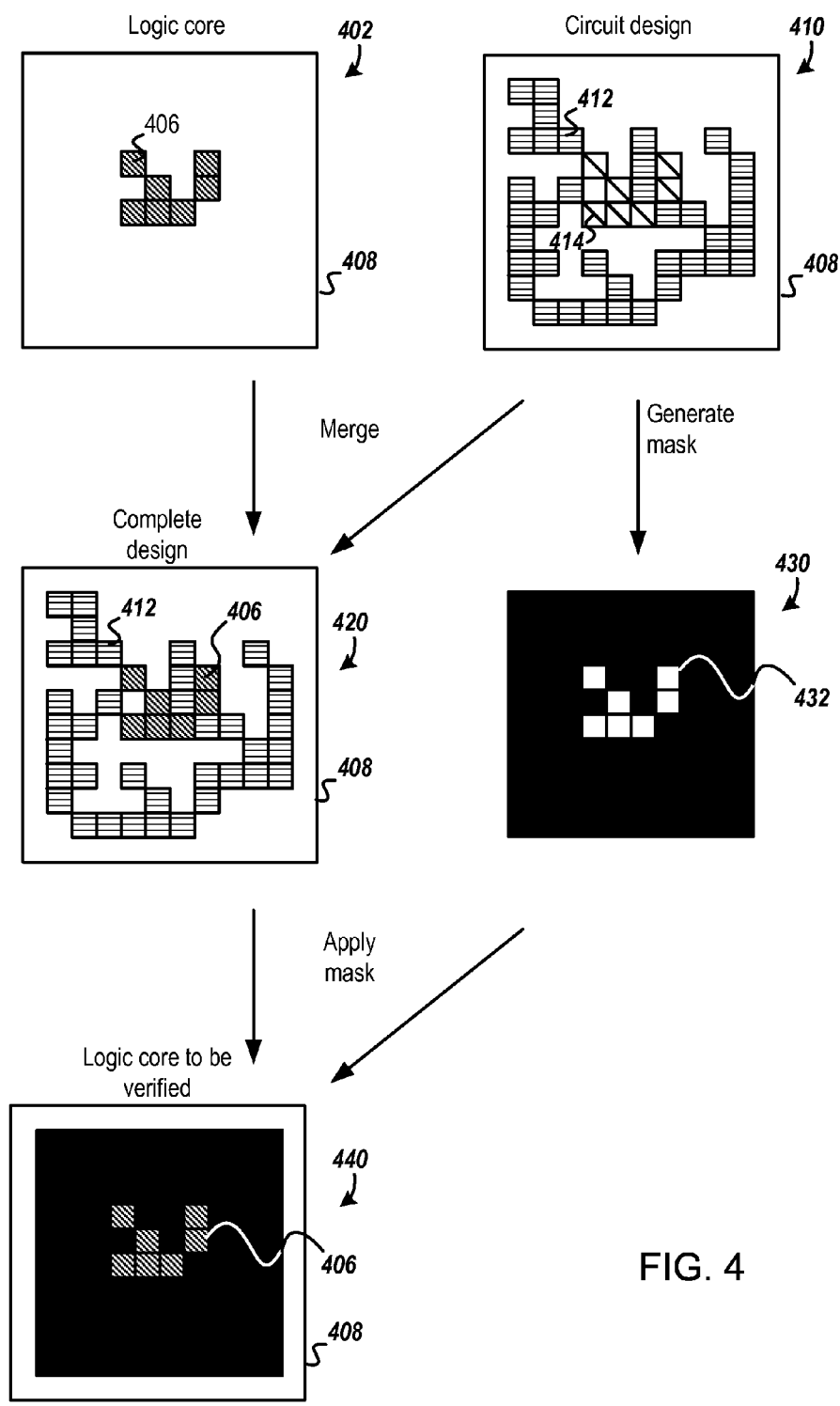
FIG. 4 illustrates an example method for extracting a logic core bitstream from a merged bitstream to verify implementation of the logic core contained in the merged bitstream.

FIG. 4 illustrates an example method for extracting a logic core bitstream, which is to be verified, from a merged bitstream to verify whether or not the implementation of the logic core contained in the merged bitstream is consistent with an expected implementation of the logic core. In this example, extraction of the logic core bitstream is performed by means of a bit masking process. Sub-FIG. 402 illustrates a logic core that is placed and routed for a target device 408. The logic core is illustrated by way of resources of the device that are used to implement the logic core. The logic core is implemented using routing and logic resources 406 (blocks with diagonal fill lines). A logic core bitstream (not shown) contains configuration bits that program the resources 406 of the target device 408. Thus, resources 406 may be viewed as corresponding to, or representative of, the logic core bitstream.

Sub-FIG. 410 shows a circuit design that is placed and routed for the target device 408. The resources of the target device that are used to implement the circuit design are shown as blocks 412 having horizontal fill lines. A circuit design bitstream (not shown) contains configuration bits that program the resources 412 of the target device 408. Thus, resources 412 may be viewed as corresponding to, or representative of, the circuit design bitstream. The circuit design of sub-FIG. 410 is to be merged with the placed and routed logic core of sub-FIG. 402 to produce a complete bitstream. The place-and-route process, as applied to the circuit design, reserves resources 414 (blocks with a single diagonal line) for subsequent merging with the logic core of sub-figure 402.

Sub-FIG. 420 illustrates the complete design that includes the logic core of sub-FIG. 402 as merged with the circuit design of subfigure 410. A complete bitstream (not shown) contains configuration bits that program the resources 406 and 412 of the target device 408 to implement the complete design, which includes the logic core of sub-FIG. 402 and the circuit design of sub-FIG. 410. The set of resources including resources 406 and 412 may be viewed as corresponding to, or representative of, the complete design bitstream.

Sub-FIG. 430 shows a mask that is created to be used in extracting the logic core of sub-FIG. 402 from the merged design of sub-FIG. 420. In this example, the mask of sub-FIG. 430 masks all bits of merged design of sub-FIG. 420 except those corresponding to resources 406 used to implement the logic core. The white blocks 432 correspond to the resources 406 that implement the logic core. The black portion of sub-FIG. 430 corresponds to all resources of the device 408 that are not used to implement the logic core. A mask bitstream (not shown) contains a first set of bits corresponding to the resources 406 used to implement the logic core and a second set of bits corresponding to the resources of the device 408 that are not used to implement the logic core. The white blocks 432 and black portion of sub-figure may be viewed as corresponding to, or representative of, the first set of bits and the second set of bits of the mask bitstream, respectively.

Sub-FIG. 440 illustrates the implementation of the logic core as extracted from the complete design of sub-FIG. 420. Blocks 406 represent the resources of the device 408 used to implement the logic core. A bitstream to be verified (not shown) contains a set of bits corresponding to the resources 406 used to implement the logic core. The values of the set of bits are the values used to program resource 406 as extracted from the complete design bitstream, which was discussed in association with sub-FIG. 420. The bitstream to be verified may be compared to a reference logic core bitstream for verification as described above. If the extracted core is identical to the reference logic core bitstream, the complete design bitstream of sub-FIG. 420 is verified as having a correct implementation of the logic core of sub-figure 402.

Figure 5:
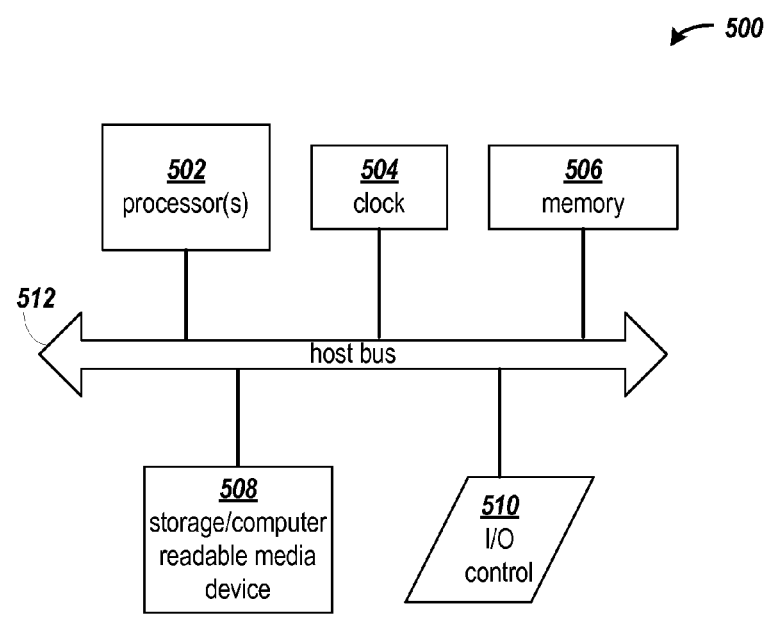
FIG. 5 illustrates a block diagram of a general purpose processor computing arrangement for implementing the processes described herein.

FIG. 5 illustrates a block diagram of a computing arrangement that may be configured to implement the integration and verification processes described herein. Those skilled in the art will appreciate that various alternative computing arrangements, including a plurality of processors and a memory arrangement configured with program code, would be suitable for hosting the processes and data structures of the one or more embodiments. The program code, encoded in a processor executable format, may be stored and provided via a variety of computer-readable storage media or delivery channels such as magnetic or optical disks or tapes, electronic storage devices, or as application services over a network.

Processor computing arrangement 500 includes two or more processors 502, a clock signal generator 504, a memory unit 506, a storage unit 508, and an input/output control unit 510 coupled to host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 502 may be one or more general-purpose processors, or a combination of one or more general-purpose processors and suitable co-processors, a multi-core processor, or one or more specialized processors (e.g., RISC, CISC, pipelined, etc.).

The memory arrangement 506 typically includes multiple levels of cache memory and a main memory. The storage arrangement 508 may include local and/or remote persistent storage such as provided by magnetic disks (not shown), flash, EPROM, or other non-volatile data storage. The storage unit may be read or read/write capable. Further, the memory 506 and storage 508 may be combined in a single arrangement.

The processor arrangement 502 executes the software in storage 508 and/or memory 506 arrangements, reads data from and stores data to the storage 508 and/or memory 506 arrangements, and communicates with external devices through the input/output control arrangement 510. These functions are synchronized by the clock signal generator 504. The resource of the computing arrangement may be managed by either an operating system (not shown), or a hardware control unit (not shown).

Figure 6:
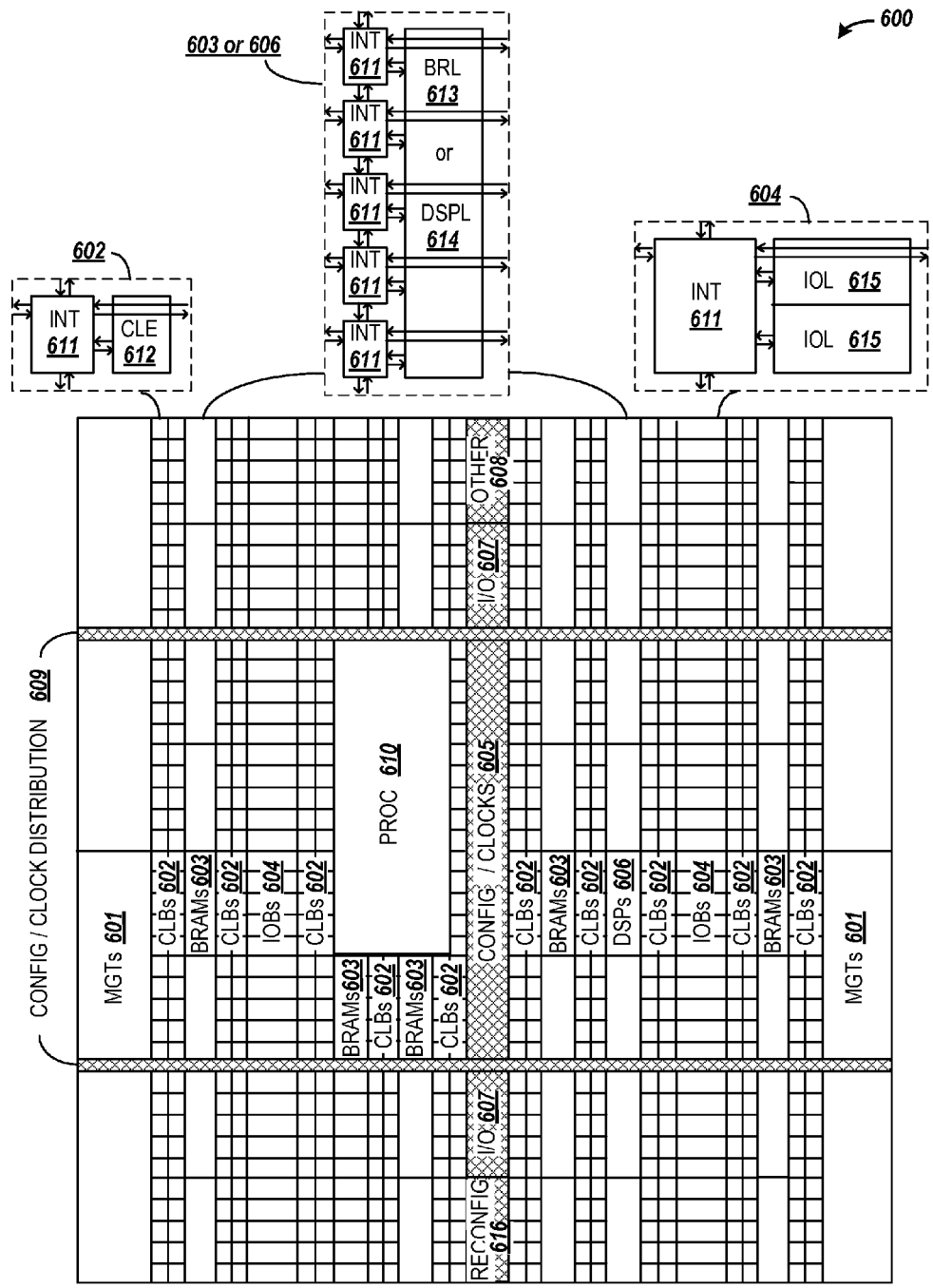
FIG. 6 illustrates a block diagram of a programmable integrated circuit target device.

FIG. 6 illustrates a block diagram of an example programmable IC that may be configured and/or verified in accordance with various embodiments of the invention. A programmable IC, such as an FPGA, can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, e.g., clock ports, and other programmable logic 608 such as digital clock managers, analog-to-digital converters, system monitoring logic, and so forth. Some FPGAs also include dedicated processor blocks (PROC 610) and internal and external reconfiguration ports (not shown).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

The embodiments of the present invention are thought to be applicable to a variety of methods and systems for verification of logic core implementation. Other aspects and embodiments will be apparent to those skilled in the art from consideration of the specification and practice of the invention disclosed herein. The embodiments may be implemented as one or more processors configured to execute software, as an application specific integrated circuit (ASIC), or as a logic on a programmable logic device, for example. It is intended that the specification and illustrated embodiments be considered as examples only, with a true scope and spirit of the invention being indicated by the following claims.

What is claimed is:

1. A method for verifying implementation of a logic core in a complete bitstream, the method comprising:
using at least one processor programmed to perform operations including:
extracting a logic core bitstream from the complete bitstream;
comparing the logic core bitstream to a reference bitstream of the logic core for a target device;
in response to no discrepancy in the comparison of the logic core bitstream and the reference bitstream, storing a data value indicating that the logic core implementation contained in the complete bitstream is verified; and
in response to a discrepancy in the comparison of the logic core bitstream and the reference bitstream, storing a data value indicating that the logic core implementation contained in the complete bitstream is not verified.

2. The method of claim 1, wherein the extracting the logic core bitstream includes masking the complete bitstream with a bitstream mask for the logic core for the target device.

3. The method of claim 1, wherein the comparing the logic core bitstream to the reference bitstream excludes comparison of bits of the logic core bitstream and the reference bitstream representing initialization data of the logic core.

4. The method of claim 3, further comprising extracting initialization data of the logic core from the complete bitstream.

5. The method of claim 1, further comprising decrypting an encrypted bitstream with a cryptographic key associated with the target device to produce the complete bitstream.

6. The method of claim 1, wherein:
the complete bitstream is encrypted with a first cryptographic key;
the reference bitstream is encrypted with the first cryptographic key; and
the comparing the logic core bitstream to the reference bitstream compares the bitstreams in encrypted form.

7. The method of claim 1, further comprising:
performing place and route of a circuit design for the target device while avoiding use of routing resources and logic resources used by an implemented logic core that is placed and routed for the target device;
converting the implemented logic core and the placed and routed circuit design into the complete bitstream; and
storing the complete bitstream in a memory.

8. The method of claim 7, further comprising generating a bitstream mask, the bitstream mask configured to mask bits of the complete bitstream that do not correspond to the implemented logic core and are co-located within a configuration memory region of the target device that describes the implemented logic core.

9. The method of claim 7, wherein the converting the implemented logic core and the placed and routed user circuit design into the complete bitstream includes:
merging the implemented logic core with the placed and routed circuit design to produce a merged circuit design; and
generating the complete bitstream from the merged circuit design.

10. The method of claim 9, further comprising converting the implemented logic core into the reference bitstream.

11. The method of claim 7, wherein:
the implemented logic core is in a bitstream format; and
the converting of the implemented logic core and the placed and routed circuit design into the complete bitstream includes:
converting the placed and routed circuit design into a bitstream format to produce a design bitstream; and
merging the implemented logic core in the bitstream format and the design bitstream to produce the complete bitstream.

12. The method of claim 7, wherein the converting the implemented logic core and the placed and routed user circuit design into the complete bitstream includes:
converting the implemented logic core into the reference bitstream;
converting the placed and routed user circuit design into a design bitstream; and
merging the reference bitstream and the design bitstream into the complete bitstream.

13. A system for verifying implementation of a logic core in a complete bitstream, the system comprising:
one or more processors; and
a memory arrangement coupled to the one or more processors, wherein the memory arrangement is configured with instructions that when executed by the one or more processors cause the one or more processors to perform operations including:
extracting a logic core bitstream of the logic core from the complete bitstream;
comparing the logic core bitstream to a reference bitstream of a verified logic core implementation for a target device;
in response to no discrepancy in the comparison of the logic core bitstream and the reference bitstream, storing a data value indicating that the logic core implementation extracted from the complete bitstream is verified; and
in response to a discrepancy in the comparison of the logic core bitstream and the reference bitstream, storing a data value indicating that the logic core implementation extracted from the complete bitstream could not be verified.

14. The system of claim 13, wherein the extracting the logic core bitstream includes masking the complete bitstream with a bitstream mask for the implemented logic core to extract the logic core bitstream.

15. The system of claim 13, wherein the comparing the logic core bitstream to the reference bitstream excludes comparison of bits of the logic core bitstream and reference bitstream representing initialization data of the logic core.

16. The system of claim 13, wherein the instructions further cause the one or more processors to perform operations including:
    performing placement and routing of a circuit design for the target device, the placement and routing of the circuit design not utilizing routing resources and logic resources used by an implemented logic core that is placed and routed for the target device;
    converting the implemented logic core and the placed and routed circuit design into the complete bitstream; and
    storing the complete bitstream in a memory.

17. The system of claim 16, wherein the instructions further cause the one or more processors to perform operations including:
    generating a bitstream mask, the bitstream mask configured to mask bits of the complete bitstream that do not correspond to the implemented logic core and are co-located within a configuration memory region of the target device that describes the implemented logic core.

18. The system of claim 16, wherein the converting the implemented logic core and the placed and routed user circuit design into the complete bitstream includes:
    merging the implemented logic core with the placed and routed circuit design to produce a merged circuit design; and
    generating the complete bitstream from the merged circuit design.

19. The system of claim 16, wherein:
    the implemented logic core is in a bitstream format; and
    the converting of the implemented logic core and the placed and routed circuit design into the complete bitstream includes:
        converting the placed and routed circuit design into a bitstream format to produce a design bitstream; and
        merging the implemented logic core in the bitstream format and the design bitstream to produce the complete bitstream.

20. A method for verifying implementation of a logic core after placement and routing, the method comprising:
    using at least one processor programmed to perform operations including:
        performing place and route of a circuit design while avoiding routing and logic resources utilized by a pre-implemented version of the logic core for a target programmable IC:
        merging the placed and routed circuit design and the pre-implemented version of the logic core to produce a complete design;
        converting the complete design into a bitstream format to produce a complete bitstream;
        extracting a logic core bitstream from the complete bitstream; and
        comparing the logic core bitstream to a reference bitstream of the logic core to verify there is no discrepancy between the logic core bitstream and the reference bitstream.

* * * * *